United States Patent [19]
Lin et al.

[11] Patent Number: 5,399,614
[45] Date of Patent: Mar. 21, 1995

[54] SOLVENTLESS OR HIGH SOLIDS-CONTAINING SILICONE PRESSURE SENSITIVE ADHESIVE COMPOSITIONS

[75] Inventors: Shaow B. Lin, Schenectady; Jeffrey H. Wengrovius, Scotia, both of N.Y.

[73] Assignee: General Electric Company, Waterford, N.Y.

[21] Appl. No.: 175,803

[22] Filed: Dec. 30, 1993

Related U.S. Application Data

[62] Division of Ser. No. 675,232, Mar. 26, 1991, Pat. No. 5,292,586.

[51] Int. Cl.$^6$ ............... C08L 83/00; C08F 283/00; C08G 77/00
[52] U.S. Cl. .................... 524/588; 525/478; 528/15; 528/31; 528/32; 528/33
[58] Field of Search ............. 524/588; 525/478; 528/15, 31, 32, 33

[56] References Cited

U.S. PATENT DOCUMENTS

| | | | |
|---|---|---|---|
| 3,983,298 | 9/1976 | Hahn et al. | 428/355 |
| 4,774,297 | 9/1988 | Murakami et al. | 525/478 |
| 4,988,779 | 1/1991 | Medford et al. | 525/478 |

FOREIGN PATENT DOCUMENTS

| | | |
|---|---|---|
| 0269454 | 6/1988 | European Pat. Off. |
| 0355991 | 2/1990 | European Pat. Off. |

*Primary Examiner*—Melvyn I. Marquis
*Assistant Examiner*—Karen A. Dean

[57] ABSTRACT

Solventless or low solvent-containing silicone pressure sensitive adhesive compositions having excellent adhesive strength and high tack are provided, comprising (A) a toluene-soluble resinous copolymer containing $R_3SiO_{\frac{1}{2}}$ units and $SiO_{4/2}$ units; (B) a vinyl-endblocked polydiorganosiloxane having a viscosity of 10 to 500 centipoise at 25° C.; (C) a hydride-endblocked polydiorganosiloxane having a viscosity of 10 to 1000 centipoise at 25° C.; the ratio of silicon-bonded hydrogen atoms in (C) to olefinically unsaturated radicals in the total of (A) and (B), being in the range of from about 1.2:1 to about 15.0:1 ;and (D) a hydrosilation catalyst.

2 Claims, No Drawings

SOLVENTLESS OR HIGH SOLIDS-CONTAINING SILICONE PRESSURE SENSITIVE ADHESIVE COMPOSITIONS

This is a divisional of application Ser. No. 07/675,232, filed on Mar. 26, 1991, now U.S. Pat. No. 5,292,586.

CROSS REFERENCE TO RELATED APPLICATIONS

Reference is made to the concurrently filed applications identified as U.S. Pat. No. 5,190,827 and U.S. Ser. No. 07/675,380 which is pending.

BACKGROUND OF THE INVENTION

The present invention relates to silicone compositions suitable for forming pressure sensitive adhesive compositions. More particularly, the present invention relates to solventless or high solids-containing, addition-curable silicone compositions suitable for forming pressure sensitive adhesive compositions having excellent tack and adhesive properties.

The term "pressure sensitive adhesive" (PSA) as used herein refers to adhesives that can be adhered to a surface and yet can be stripped from the surface without transferring more than trace quantities of adhesive to the surface, and can be readhered to the same or another surface because the adhesive retains some or all of its tack and adhesive strength.

Silicone pressure sensitive adhesives have excellent adhesive and cohesive strength and high tack as well as excellent heat resistance, cold resistance, electrical properties, and the like, which makes them applicable for use as electrical-insulating tape and for various pressure-sensitive products which must be resistant to hot and cold.

However, a drawback associated with silicone pressure sensitive adhesives is the use, handling, and emission of flammable and volatile organic compounds, e.g., organic solvents, in the preparation of the pressure sensitive adhesives from compositions containing high levels of organic solvent. Conventional pressure sensitive adhesives are made using high viscosity vinyl polymer inputs. Solvent is generally used for the purpose of reducing the viscosity of the composition to a level which renders the curable composition processable. It would be desirable to provide solventless or high solids containing (i.e., low solvent-containing) pressure sensitive adhesive silicone compositions containing low viscosity vinyl polymer inputs.

Addition-curable, low solvent-containing silicone compositions capable of curing to form pressure sensitive adhesive compositions are known in the art.

U.S. Pat. No. 3,983,298 (Hahn et al.) is directed to a silicone composition suitable for use as a pressure sensitive adhesive and obtained by mixing components consisting essentially of (a) 50–60 parts by weight of a solid, benzene-soluble resin copolymer consisting essentially of $R_3SiO_{\frac{1}{2}}$ units and $SiO_{4/2}$ units, which is known as an "MQ" resin, (b) 40–50 parts by weight of a vinyl-terminated polydiorganosiloxane having a viscosity of from 20,000 to 100,000 centistokes at 25° C., (c) a hydrogen-containing organopolysiloxane in an amount sufficient to provide from 1.0 to 20.0 silicon-bonded hydrogen atoms for every olefinically unsaturated radical in the total of (a) plus (b), and (d) a platinum-containing catalyst. It is pointed out in Hahn et al. that compositions of the prior art based on mixtures of a benzene soluble resin copolymer containing $R_3SiO_{\frac{1}{2}}$ units and $SiO_{4/2}$ units (hereinafter sometimes referred to as "MQ resin") and low viscosity silicones do not form pressure sensitive adhesive compositions.

U.S. Pat. No. 4,774,297 (Murakami et al.) is directed to a composition suitable for forming a pressure sensitive adhesive having excellent tack and adhesive strength, comprising (A) 30–70 parts by weight of a vinyl-terminated polydiorganosiloxane having a viscosity of at least 500,000 centistokes at 25° C., (B) 70–30 parts by weight of an organopolysiloxane containing $R_3SiO_{\frac{1}{2}}$ units and $SiO_{4/2}$ units, (C) an organohydrogensiloxane in an amount sufficient to provide 1–20 silicon-bonded hydrogen atoms per alkenyl group, (D) a platinum-containing catalyst, and (E) from 25–400 parts by weight of an organic solvent. The vinyl polymer used in the Murakami et al. composition has a viscosity of at least 500,000 centistokes and preferably at least one million centistokes at 25° C.

European Patent Application No. 0269454 (Murakami et al.) discloses a composition suitable for forming a pressure sensitive adhesive having excellent tack and adhesive strength and comprising an alkenyl group-containing silicone polymer, a tackifying silicone resin, an organohydrogensiloxane, and a platinum-containing catalyst. There is said to be no specific restriction on the molecular weight of the alkenyl groups containing silicone polymer as long as no adverse effect accrues with respect to the workability of the pressure sensitive adhesive composition. If the pressure sensitive adhesive composition is solventless, the viscosity of the alkenyl group-containing silicone polymer is no more than 100,000 centistokes at 25° C., while in a solvent-containing composition, the alkenyl group-containing silicone polymer should have a viscosity of at least one million centistokes at 25° C. The organohydrogenpolysiloxane should be present in an amount sufficient to provide 1 to 40 silicon-bonded hydrogen atoms per alkenyl group in the composition. The Murakami et al. reference does not disclose a pressure sensitive adhesive composition prepared with low viscosity vinyl-functional silicones.

U.S. Pat. No. 4,988,779 (Medford et al.) discloses a composition having a solvent content of no more than 5-10% by weight and suitable for forming a pressure sensitive adhesive, wherein the composition comprises from 30 to 50 parts of a vinyl endblocked polydiorganosiloxane fluid having a viscosity of from 500 to 10,000 centistokes at 25° C., from 50 to 70 parts of a benzene soluble resin copolymer containing $R_3SiO_{\frac{1}{2}}$ units and $SiO_{4/2}$ units, an organopolysiloxane having silicon bonded hydrogen atoms, and a platinum catalyst. The hydrogen-containing organopolysiloxane is present in an amount sufficient to provide from 1.0 to 30.0 silicon bonded hydrogen atoms for every olefinically unsaturated radical in the composition.

European Patent Application No. 0355991 (Boardman) is directed to a pressure sensitive adhesive composition having a high solids content, i.e., typically in excess of 95% by weight, preferably in excess of 98% by weight, comprising (a) an MQ resin containing silicon-bonded hydroxyl radicals ranging from 1 to 4 percent by weight of the copolymer, (b) an alkenyl-terminated polydiorganosiloxane, (c) a hydrogen-terminated polydiorganosiloxane, (d) a crosslinking agent, and (e) a hydrosilation catalyst. The number of repeating units in the alkenyl-terminated polydiorganosiloxane and the hydrogen-terminated polydiorganosiloxane ranges from 0 to 1000 in each. The crosslinking agent is an organosiloxane containing more than two groups that will condense with a hydrogen or alkenyl group of an organopolysiloxane in a hydrosilation reaction. The ratio of the total number of silicon-bonded alkenyl groups present in (d) and (b) to the total number of silicon-bonded hydrogen atoms present in (d) and (c) ranges from 0.8 to 1.2, i.e., the ratio of the total number of silicon-bonded hydrogen atoms in (d) and (c) to the total number of silicon-bonded alkenyl groups in (d) and (b) ranges from 0.83–1.25:1. The Boardman composition contains an external crosslinking agent. In the examples in Boardman, 1,3,5,7-tetravinyl-tetramethyl-cyclotetrasiloxane is used as the crosslinker. The results reported in the examples show that the tack obtained therein ranged from low to moderate.

It is desirable to provide solventless or high solids-containing pressure sensitive adhesive compositions containing polymer inputs having viscosities lower than those taught in the prior art. It is further desirable to provide solventless or high solids containing pressure sensitive adhesive compositions which cure to form pressure sensitive adhesives having high tack values as well as high peel adhesion values.

Such silicone pressure sensitive adhesive compositions are provided by the present invention.

SUMMARY OF THE INVENTION

The present invention is directed to a solventless or high solids-containing organopolysiloxane composition curable to produce a pressure sensitive adhesive having high tack and high peel adhesion properties, comprising by weight:

(A) from about 50 to about 75 parts by weight of a toluene soluble, resinous copolymer comprising $R_3SiO_{\frac{1}{2}}$ units and $SiO_{4/2}$ units wherein R is a monovalent hydrocarbon radical having from 1 to about 6 carbon atoms, wherein the resinous copolymer comprises from about 0.2% to about 5.0% by weight, based on the total weight of the copolymer, of hydroxyl radicals, at least 95% of all R groups being an alkyl group, the total number of R radicals that are alkenyl radicals being 0–0.5% of all R radicals, the molar ratio of $R_3SiO_{\frac{1}{2}}$ units to $SiO_{4/2}$ units being from about 0.6 to about 0.9 inclusive;

(B) an alkenyl-terminated polydiorganosiloxane having a viscosity of from about 10 to about 500 centipoise at 25° C. and having the general formula

  (I)

wherein each $R^1$ is independently an alkyl group having from 1 to about 10 carbon atoms or an aryl group, $R^2$ is an alkenyl group having from 1 to about 10 carbon atoms, each $R^3$ is independently $R^1$ or $R^2$, with the proviso that at least 99.5% of all $R^3$ radicals are $R^1$, and "m" is a number in the range of from about 1 to about 300;

(C) a hydride-terminated organohydrogenpolysiloxane compatible with the mixture of (A) and (B) and having a viscosity of from about 10 to about 1000 centipoise at 25° C. and having the general formula

  (II)

wherein each $R^4$ is independently an alkyl group having from 1 to about 10 carbon atoms or an aryl group, and each $R^5$ is hydrogen or $R^4$, with the proviso that at least 99.5% of all $R^5$ radicals are $R^4$, "a" is a number in the range of from 1 to about 500, them being at least two silicon-bonded hydrogen atoms per molecule of (C), no silicon atom bearing more than one silicon-bonded hydrogen atom; the total of (B) and (C) being from about 25 to about 50 parts by weight; the total of (A), (B), and (C) being 100 parts by weight; the molar ratio of silicon-bonded hydrogen groups in (C) to silicon-bonded alkenyl groups in (A) and (B) being in the range of from about 1.2:1 to about 15.0:1;

(D) a catalytic amount of a hydrosilation catalyst; and (E) from 0 to about 40% by weight of an organic solvent.

The present invention is based on the discovery that a solventless or high solids-containing pressure sensitive adhesive composition having high tack and high peel adhesive properties can be obtained from low viscosity vinyl polymer inputs by (1) first effecting a hydrosilation reaction between (A), (B) and (C) in the presence of (D), wherein the molar ratio of silicon-bonded hydrogen groups in (C) to silicon-bonded alkenyl groups in (B) (sometimes referred to herein as the "SiH:SiVinyl" ratio) is within a critical range, and further wherein the hydroxy content of the resinous copolymer (A) is at a critical level, and (2) then effecting a condensation reaction between the hydroxyl radicals on the resinous copolymer (A) and the excess terminal hydride radicals on (C).

The compositions of the present invention provide several advantages. They cure to form pressure sensitive adhesives having a tack of greater than 200 grams/cm², preferably greater than 700 grams/cm²; a peel adhesion strength greater than 25 ounces/inch, preferably greater than 30 ounces/inch. The compositions of this invention are prepared from low viscosity vinyl polymers and require no solvent to improve workability in the uncured state. Furthermore, the compositions of this invention can cure fast at low temperatures to produce pressure sensitive adhesives having superior properties.

Other aspects of this invention are directed to pressure sensitive adhesives made from the curable compositions of this invention and to a method for preparing the pressure sensitive adhesives.

DETAILED DESCRIPTION OF THE INVENTION

Component (A) of the composition of the present invention is a toluene-soluble resinous organopolysiloxane copolymer which imparts tack to the cured pressure sensitive adhesive prepared from the composition. The resinous copolymer (A) comprises $R_3SiO_{\frac{1}{2}}$ units (also known as "M" units) and $SiO_{4/2}$ units (also known as "Q" units) wherein R is a monovalent hydrocarbon radical having from 1 to about 6 carbon atoms. Examples of radicals represented by R include alkyl radicals such as methyl, ethyl, and isopropyl; cycloaliphatic radicals such as cyclopentyl and cyclohexenyl; olefinic radicals, such as vinyl and allyl; and the phenyl radical. At least 95% of all R groups are alkyl groups, preferably methyl. The total number of R radicals that are alkenyl radicals being 0–0.5% of all R radicals. The molar ratio of $R_3SiO_{\frac{1}{2}}$ units to $SiO_{4/2}$ units is from about 0.6 to about 0.9 inclusive. The resinous copolymer comprises from about 0.2% to about 5.0% and preferably from about 1.0 to about 3.0%, and most preferably from about 1.5% to about 2.5%, by weight based on the total weight of the copolymer, of hydroxyl radicals. The hydroxyl radicals are bonded directly to the silicon atom of the $SiO_{4/2}$ units or of the $R_3SiO_{\frac{1}{2}}$ units or some of the hydroxyl radicals can be bonded directly to the silicon atom of the $SiO_{4/2}$ units and some of the hydroxyl radicals can be bonded directly to the silicon atom of the $R_3SiO_{\frac{1}{2}}$ units.

(A) is present in the composition of this invention in an amount within the range of from about 50 to about 75, preferably from about 50 to about 70, and most preferably from about 55 to about 62, parts by weight.

Methods for making the resinous copolymer (A) are known in the art. Reference is made, for example, to U.S. Pat. No. 2,676,182 to Daudt et al., which is hereby incorporated by reference herein. In the Daudt et al. method, a silica hydrosol is reacted under acidic conditions with a source of triorganosiloxy units such as a hexaorganodisiloxane, e.g., hexamethyldisiloxane, or a hydrolyzable triorganosilane, e.g., trimethylchlorosilane, or mixtures thereof, and recovering a benzene soluble resin copolymer having M and Q units.

The resinous copolymer (A) is a solid, resinous material and is most often available as a solution in a solvent such as xylene or toluene, generally as a 40% to 60% by weight solution. For ease of handling of the composition of the present invention, one part of the solution of the resinous copolymer is usually dissolved in some or all of the vinyl chain-stopped polysiloxane (B) and the other part of the solution of the resinous copolymer is usually dissolved in some or all of the hydride chain-stopped polysiloxane (C) and the solvent stripped from each of the resulting solutions to produce solutions of resinous copolymer (A) in the vinyl-chainstopped polysiloxane (B) and in the hydride-chainstopped polysiloxane (C). The solution of (A) and (B) typically contains from about 50 to about 75, preferably from about 50 to about 70, and most preferably from about 55 to about 62, parts by weight, of (A), and from about 25 to about 50, preferably from about 30 to about 50, and most preferably from about 38 to about 45 parts by weight, of (B). The solution of (A) and (C) typically contains from about 50 to about 75, preferably from about 50 to about 70, and most preferably from about 55 to about 62, parts by weight, of (A), and from about 25 to about 50, preferably from about 30 to about 46, and most preferably from about 38 to about 45 parts by weight, of (C).

Component (B) of the composition of the present invention is an alkenyl-terminated polydiorganosiloxane having the general formula $$R^2R^1_2SiO(R^3_2SiO)_mSiR^1_2R^2 \qquad (I)$$

wherein each $R^1$ is independently an alkyl group having from 1 to about 10 carbon atoms or an aryl group, $R^2$ is an alkenyl group having from 1 to about 10 carbon atoms, each $R^3$ is independently $R^1$ or $R^2$, with the proviso that at least 99.5% of all $R^3$ radicals are $R^1$, and "m" is a number in the range of from about 1 to about 300.

In formula (I), $R^1$ is an alkyl group having from 1 to about 10 carbon atoms such as methyl, ethyl, and propyl; or aryl group such as phenyl. Preferably, at least 95 percent and most preferably 100 percent of all $R^1$ radicals are alkyl and most preferably methyl. $R^2$ is an alkenyl group such as vinyl, allyl, propenyl, or hexenyl. Preferably, $R^2$ is vinyl. Each $R^3$ is either $R^1$ or $R^2$, with the proviso that at least 99.5%, and preferably 100%, of all $R^3$ radicals are $R^1$. Like $R^1$, $R^3$ is preferably an alkyl group having from 1 to about 10 carbon atoms, and most preferably methyl. The presence of silicon-bonded alkenyl groups on the internal silicon atoms of the polymer chain of formula (I) constitute impurities which are preferably minimized or avoided.

In formula (I), "m" represents a number from about 1 to about 300, preferably from about 20 to about 250, and most preferably from about 60 to about 200.

The viscosity of the alkenyl-terminated polydiorganosiloxane (B) ranges from about 10 to about 500, preferably from about 20 to about 400, and most preferably from about 100 to about 300, centipoise at 25° C.

Alkenyl-terminated polydiorganosiloxanes (B) can be prepared by any of the conventional methods for preparing triorganosiloxane-terminated polydiorganosiloxanes. For example, a proper ratio of the appropriate hydrolyzable silanes, e.g., vinyldimethylchlorosilane and dimethyldichlorosilane, may be cohydrolyzed and condensed or alternately an appropriate 1,3-divinyltetraorganodisiloxane, e.g., symmetrical divinyldimethyldiphenyldisiloxane or divinyltetramethyldisiloxane, which furnishes the endgroups of the polydiorganosiloxane, may be equilibrated with an appropriate diorganopolysiloxane, e.g., octamethyicyclotetrasiloxane, in the presence of an acidic or basic catalyst. Regardless of the method of preparation of polydiorganosiloxane (B), there is usually coproduced a varying quantity of volatile, cyclic polydiorganosiloxanes. Volatile cyclic polydiorganosiloxanes, e.g., methyl tetramer, should be removed, since they are volatile and adversely affect pressure sensitive adhesive properties.

The amount used of polydiorganosiloxane (B), its formula (presented hereinabove as formula (I)), and its viscosity, for the purposes of this invention, refers to the essentially cyclic free portion of the polydiorganosiloxane. This essentially cyclic free portion can be determined by heating a sample of the polydiorganosiloxane at 150° C. for up to 1 hour to yield a residue. This residue will be essentially free of cyclic material with the exception of trace quantities of macrocyclic polydiorganosiloxanes which are non-volatile at 150° C. and atmospheric pressure. Many of these polydiorganosiloxanes (B) are commercially available. Furthermore, component (B) can be homopolymers or copolymers or their several mixtures as long as they are alkenyl-endblocked polydiorganosiloxanes of formula (I).

Component (C) is an organohydrogenpolysiloxane compatible with the mixture of (A) and (B) and having the general formula $$R^4_2HSiO(R^5_2SiO)_aSiHR^4_2 \qquad (II)$$

wherein each $R^4$ is independently an alkyl group having from 1 to about 10 carbon atoms or an aryl group, and each $R^5$ is hydrogen or $R^4$, with the proviso that at least 99.5%, and preferably 100%, of all $R^5$ radicals are $R^4$.

The term "compatible" means that the required amount of organohydrogenpolysiloxane (C) is at least partially soluble in the mixture of (A) and (B) and will exist in a uniformly dispersed state in the composition of this invention while participating in the curing reaction, until the cure has been effected.

Examples of alkyl groups represented by $R^4$ and $R^5$ in formula (11) above include methyl, ethyl, and propyl. An example of an aryl group represented by $R^4$ and $R^5$ is phenyl. $R^4$ is preferably an alkyl radical and most preferably methyl. Preferably, at least 99.5 percent and most preferably 100 percent of all $R^5$ radicals are alkyl and most preferably methyl.

In formula (II), "a" is a number in the range of from 1 to about 500, preferably from about 20 to about 400, and most preferably from about 60 to about 250.

The viscosity of (C) is from about 10 to about 1000, preferably from about 20 to about 750, and most preferably from about 100 to about 400, centipoise at 25° C.

The total amount of (B) and (C) is from about 25 to about 50, preferably from about 30 to about 50, and most preferably from about 38 to about 45, parts by weight.

The molar ratio of silicon-bonded hydrogen groups (i.e., "SiH") in (C) to silicon-bonded alkenyl groups (i.e., "SiVinyl") in (B) and (A) is in the range of from about 1.2:1 to about 15.0:1; preferably from about 1.25:1 to about 6.0:1, and most preferably from about 1.35:1 to about 4.5:1. The amount of (C) sufficient to fulfill these ratio requirements is determined by measuring the alkenyl or vinyl contents of the desired types and amounts of components (A) and (B), which is typically done by Silicone-29 NMR. A precise amount of (C) can be used to provide a specific ratio of SiH to SiVinyl (also referred to herein as "SiH:SiVi").

It is critical to the present invention that the molar ratio of silicon-bonded hydrogen groups (i.e., sometimes referred to herein as "SiH") in (C) to silicon-bonded alkenyl groups (i.e., sometimes referred to herein as "SiVi") in (B) be in the ranges recited above. Maintaining an SiH:SiVi ratio within these limits ensures that a high molecular weight silicone network is formed during cure and ensures maximum tack values and thermal stability of the cured pressure sensitive adhesive developed through additional reaction between the available excess SiH groups with silanol groups of MQ resin.

The hydride polysiloxane (C) must be terminated with hydride groups so that polymer chain extension with the terminal vinyl groups on (B) will occur during cure.

Organohydrogenpolysiloxanes and their preparation are well known in the organosilicon polymer art; some are commercially available. Briefly, the preparation of organohydrogensiloxanes can be accomplished in any suitable manner such as by hydrolyzing silanes, such as chlorosilanes, and equilibrating the resulting hydrolyzate under acid catalysis. Alternately, a mixture of suitable siloxanes, such as cyclic siloxanes and linear siloxanes, can be copolymerized and equilibrated under acid catalysis. For example, a hydride-stopped silicone fluid suitable for use in the present invention can be prepared by reacting tetramethyldisiloxane with cyclic methyl tetramer of predetermined ratio in the presence of Filtrol-20 as catalyst for 4-6 hours at 80°-100° C. The Filtrol-20 catalyst is then removed by filtration and the residual reactants are removed by vacuum stripping.

Component (D) of the composition of the present invention is a catalyst which promotes the hydrosilation reaction. Useful catalysts for facilitating the hydrosilation curing reaction include precious metal catalysts such as those which use ruthenium, rhodium, palladium, osmium, iridium, and platinum, and complexes of these metals. Examples of suitable hydrosilation catalysts for use in the present invention am disclosed, for example, in U.S. Pat. Nos. 3,159,601 and 3,159,662 (Ashby); U.S. Pat. No. 3,220,970 (Lamoreaux); U.S. Pat. No. 3,814,730 (Karstedt); U.S. Pat. No. 3,516,946 (Modic), and U.S. Pat. No. 4,029,629 (Jeram); all of the foregoing patents being hereby incorporated by reference herein.

Preferably, the hydrosilation catalyst used in the present invention is a platinum-containing catalyst. Suitable platinum-containing hydrosilation catalysts include any of the well known forms of platinum that are effective for catalyzing the reaction of silicon-bonded hydrogen atoms with silicon-bonded vinyl groups, such as finely divided metallic platinum, platinum on a finely divided carrier such as alumina, compounds of platinum such as chloroplatinic acid and complexes of platinum compounds.

Other suitable platinum-containing hydrosilation catalysts for use in the present invention include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid catalysts are thermally activated. Also useful are the photoactive platinum catalysts such as those of U.S. Pat. No. 4,510,094 to Drahnak. All of the U.S. Patents cited in the instant paragraph are incorporated by reference into the present disclosure.

Catalysts which are soluble in the mixture of (A), (B) and (C) are preferred, particularly if optical clarity is desired.

The platinum-containing catalyst (D) is present in the composition of this invention in an amount sufficient to provide at least 0.1 part by weight platinum for one million parts by weight of the combined weight of (A), (B), and (C). Frequently, such small amounts of catalyst are poisoned by trace amounts of impurities in the composition so it is advantageous to use the platinum catalyst in such quantities to provide at least 1.0 pan per million (ppm). The amount of platinum-containing catalyst is not critical with respect to the upper limit but its cost would suggest that excessive quantities be avoided. Amounts of up to 200 ppm platinum are not unusual but preferably from 1 to 35 parts by weight of platinum for every one million parts by weight of the total of (A), (B), and (C) is used.

The compositions of the present invention can further comprise from about 0 to about 40, preferably from about 0 to about 20, and most preferably about 0, percent by weight of an organic solvent (E). Suitable organic solvents include any of the solvents conventionally used with organosiloxanes and having a boiling point below approximately 250° C., such as aromatic hydrocarbons, e.g., benzene, toluene, and xylene; aliphatic hydrocarbons such as hexane, heptane, and cyclohexene; halogenated hydrocarbon solvents such as trichloroethane and chloroform; naphthas such as petroleum ether, VM and P Naphtha and refined naphthas such as Naphthalite 66/3 and oxygenated solvents such as hydrocarbon ethers, e.g., tetrahydrofuran and the dimethylether of ethylene glycol; ketones such as methyl isobutyl ketone and esters such as ethyl acetate and the like. Mixtures of organic solvents can also be used.

The components of the compositions of this invention can be mixed in any manner such as in bulk or in organic solvent. Since the resinous copolymer (A) is a solid and is conveniently prepared and handled in an organic solvent, the preparation of the composition of this invention preferably uses an organic solvent, at least for the mixing of (A) and (B). The organic solvent can be any of the solvents recited above in connection with component (E). The mixing of the components can be accomplished by any of the techniques known in the art, such as milling, blending, stirring, and the like, either in batch or in continuous process.

The composition of this invention can be prepared, with or without the aid of solvent, by simply mixing (A), (B), (C), and (D) together in the stated proportions. The order of mixing of the components is not critical, except that the organopolysiloxane (C) and the catalyst (D) are preferably brought together last. If heat is used in the preparation of the compositions of this invention, it is preferred to add the organopolysiloxane (C) after all heating operations in the preparation process have been completed. The preceding system is referred to herein as a one-component system, However, the best method of preparing the composition of this invention is based on a two-component system, wherein 2 blends are used, one comprising the resinous copolymer, which may be dissolved in about an equal weight of an organic solvent to facilitate mixing, with polydiorganosiloxane (B) and the other blend comprising the resinous copolymer, which also may be dissolved in about an equal weight of an organic solvent to facilitate mixing, with polydiorganosiloxane (C), so as to form pre-made intermediates. This method is preferred because it facilitates control of the SiH/SiVinyl ratio. To obtain compositions having at least 90% and preferably about 100% solids, the copolymer/polydiorganosiloxane blends should be devolatilized under conditions equivalent to heating for 1 hour at 150° C. at atmospheric pressure in order to obtain optimum pressure sensitive adhesive properties. Obviously, excessively high temperatures should be avoided when components (A) and (B) or their mixtures are being devolatilized. A temperature of 100° C., and preferably 80° C., should not be exceeded. The mixture of (A), (B) and solvent is devolatilized in thin film at 70° C. at full vacuum. Additional solvent may be added to the cooled, devolatilized mixtures to obtain a desired viscosity. Catalyst (D) is added to the devolatilized mixture of (A) and (B) to complete the composition of the first component of the two-component system. The second mixture is prepared by blending (A), (C), and solvent and then devolatilizing the blend under vacuum at a temperature of 70° C. A small amount of addition-cure inhibitor and additional solvent may also be added to the cooled, devolatilized mixture of (A) and (C) or (A) and (B) to obtain a desired viscosity. The final composition is completed by mixing the two components in appropriate amounts.

Thus, in a preferred embodiment of the composition of the present invention, the composition comprises by weight:
(1) a solventless mixture comprising by weight from about 55 to about 62 parts by weight of (A) and from about 38 to about 45 parts by weight of (B);
(2) a solventless mixture comprising by weight from about 55 to about 62 parts by weight of (A) and from about 38 to about 45 parts by weight of (C); and
(3) a hydrosilation catalyst.

Small amounts of additional ingredients may be added to the composition of this invention if desired. For example, antioxidants, pigments, stabilizers, fillers, and the like, may be added as long as they do not materially reduce the pressure sensitive adhesive properties of these compositions. Volatile additives are preferably added after any solvent removal operations have been completed. In addition, a condensation catalyst can be added which promotes and controls the reaction between the silanol groups on the MQ resin and the available excess hydride. Such catalysts are known in the art and include, for example, organotin compounds, acidic species, amine compounds, as well as those hydrosilation catalysts which are capable of functioning as condensation catalysts, e.g., organoplatinum compounds. If used, the condensation catalyst can be introduced only at certain stages, i.e., preferably after the hydrosilation reaction between the alkenyl radicals of component (B) and the silicon-bonded hydrogen atoms of (C) has occurred to a sufficient extent or to completion.

A long or longer "shelf life" can be obtained by mixing a platinum catalyst inhibitor in either of the components in a two-component system or in the curable mixture in the case of a one-component system. Platinum catalyst inhibitors which are useful in the composition of this invention and which display varying lengths of cure time inhibition in our compositions are those described in U.S. Pat. Nos. 3,188,299; 3,188,300; 3,192,181; 3,344,111; 3,383,356; 3,445,420; 3,453,233; 3,453,234; and 3,532,649, and others which might be known in the art. All of the patents cited in the instant paragraph are incorporated by reference herein. Concrete examples of inhibitors which can be used in the composition of the present invention include the ene-ynes, such as 3-methyl-3-pentene-1-yne and 3,5-dimethyl-3-hexene-1-yne; the alkynyl alcohols, such as 3-methyl-1-butyne-3-ol; 3,5-dimethyl-1-hexyne-3-ol; 3-methyl-1-pentyne-3-ol; and phenylbutynol; the unsaturated ester, such as alkyl and substituted alkyl maleates; and polymethylvinylcyclosiloxanes. The preferred inhibitors for use in the present invention are the dialkylmaleates and most preferably dimethylmaleate.

The effectiveness of a platinum catalyst inhibitor depends on many factors such as its chemical composition, its physical properties, its concentration, and the like. For the purposes of this invention, an effective amount of any particular platinum catalyst inhibitor can be determined by routine experimentation. Since many platinum catalyst inhibitors are relatively volatile it is preferable to add them to the compositions of this invention after any heating and/or vacuum operations of the preparative process have been completed. For maximum effectiveness, however, a platinum catalyst inhibitor should be added to the composition of this invention at least simultaneously with, and preferably prior to the mixing of components (C) and (D) or parts containing them.

As mentioned earlier herein, the present invention is based on the discovery that a solventless or high solids-containing pressure sensitive adhesive composition having high tack and high peel adhesive properties can be obtained from low viscosity vinyl polymer inputs by (1) first effecting a hydrosilation reaction between (A), (B) and (C) in the presence of (D), wherein the molar ratio of silicon-bonded hydrogen groups in (C) to silicon-bonded alkenyl groups in (B) (sometimes referred to herein as the "SiH:SiVinyl" ratio) is within a critical range, and further wherein the hydroxy content of the resinous copolymer (A) is at a critical level, and (2) then effecting a condensation reaction between the hydroxyl radicals on the resinous copolymer (A) and the excess terminal hydride radicals on (C).

The hydrosilation reaction can be carried out at temperatures ranging from about 70° C. to about 200° C. The condensation reaction between the hydroxyl radicals on the resinous copolymer (A) and the excess terminal hydride radicals on (C) can occur at a lower rate at 70° C. but occurs more readily at temperatures of 150° C. and above. Typically, the reactions are carried out by heating the mixture of components (A), (B), (C), and (D) and any optional ingredients to a temperature of 135° C. or higher for a period of from about 3 to about 5 minutes. Alternatively, the mixture of components can first be heated to a relatively low temperature such that the hydrosilation reaction occurs readily while the condensation reaction occurs less readily, and then heated to a higher temperature whereat the condensation reacts readily. The reactions may also be carried out by heating components (A)-(D) and any optional ingredients to a temperature of about 125° C. or higher for at least 5 minutes.

The condensation reaction imparts stability, and consequently greater peel adhesion and tack properties, to the cured pressure sensitive adhesive composition. Thus, without the condensation reaction, a pressure sensitive adhesive having less desirable tack and peel adhesion properties will result.

Curing time is dependent on the SiH/SiVinyl molar ratio, the thickness of the pressure sensitive adhesive, catalyst and inhibitor levels. Generally, at temperatures of 100° C.–150° C., a SiH/SiVinyl molar ratio of about 1.0:1, a PSA thickness of 1–4 mils, a catalyst level of 30 ppm and an inhibitor level of 0.5% by weight, cure time is no more than 5 minutes. The temperature and time required to cure the compositions of this invention are also interdependent. Generally, the compositions of this invention will cure at a temperature of about 125° C. and higher for a cure time of about 5 minutes to achieve the superior pressure sensitive adhesives of this invention. If shorter cure times are desired, e.g., about 3 minutes, then the cure temperature is typically a bit higher, i.e., about 135° C. Preferably, cure temperatures of from about 135° C. or higher for a cure time of up to about 5 minutes are used. The exceptional pressure sensitive adhesive characteristics of these compositions are developed when the composition is cured and the cured composition is essentially free of organic solvent.

Preferably, the uncured composition of this invention should be used within a few hours after being prepared, although this time interval from preparation to use, otherwise known as "shelf life", can be extended to several days by cooling the mixture to a temperature of $-20°$ C. or below. Equally long or longer "shelf life" can be realized by mixing a platinum catalyst inhibitor such as any of those described previously herein in either of the two components of a two-component system or in the curable mixture in the case of a one-component system.

The uncured composition of this invention can be used as a solution in one or more of the organic solvents described above or the composition can be used with no solvent present. While it is possible to use as much as 40 percent of an organic solvent based on the total weight of the composition, the presence of solvent is not required. If the presence of solvent is desired, this can be accomplished simply by not removing all of the solvent that is used in the preparation of the composition. Alternately, all of the solvent that is used in the preparation of the composition can be removed and the desired amount of the same or another solvent can be added. It will be obvious to those skilled in the art that in the case where the solvent that is used to aid in the application of the composition of this invention has a higher boiling point than the solvent used in their preparation, the necessary solvent change can be accomplished in two steps as described above or in a one step process wherein the higher boiling point solvent is present in the mixture during the removal of the lower boiling solvent. If, during the preparation of the composition of this invention, any portion of the solvent is removed, particularly if heat and/or vacuum is used to remove the solvent, it is preferred to remove the solvent prior to the addition of other volatile components such as inhibitors or additives. The removal of solvent can be accomplished by any of the known techniques such as entrainment in a stream of inert gas, evaporation, distillation, thin film stripping, and the like, and at any combination of temperature and pressure where the temperature is not allowed to exceed approximately 200° C., preferably about 150° C.

The compositions of this invention are useful as pressure sensitive adhesives and will readily stick to a solid support, whether flexible or rigid. The composition is simply applied to the surface of the support by any suitable coating means such as rolling, spreading, spraying, and the like; and cured as described above. It should be understood that the use of the compositions of this invention encompasses not only the application of the completed, uncured composition on the surface. For example, it is within the scope of this invention to apply a layer of a mixture of (A), (B), and (C) to a solid support and then add the hydrosilation catalyst (D), the needed mixing being accomplished by diffusion of (D) into the layer of (A), (B), and (C). It is preferred to delay the curing reaction until (D) is thoroughly diffused into the layer on the support. Any solvent that is present in the cured composition is preferably allowed to evaporate before the surface bearing the composition is adhered to a substrate, although this is not necessary.

The surface of the support and the substrate to which the support is adhered may be any known solid material such as metals, e.g., aluminum, silver, copper, iron, and their alloys; porous materials such as paper, wood, leather, and fabrics; organic polymeric materials such as polyolefins, e.g., polyethylene and polypropylene; fluorocarbon polymers such as polytetrafluoroethylene and polyvinylfluoride, silicone elastomers, silicone resins, polystyrene; Nylon ® polyamides, polyimides, polyesters, and acrylic polymers; painted surfaces; siliceous materials such as concrete, bricks, cinderblocks, and glass, e.g., glass cloth and the like. Porous materials such as glass cloth are often impregnated with a substance that will prevent the migration of the PSA from one surface to another surface of the support. It is also well known to chemically treat the surface of a fluorocarbon polymer support to enhance the adhesion of a PSA to said surface.

Solid supports bearing the cured compositions of this invention are reliably adhered to any solid substrate because the compositions possess the desirable combination of high tack and good adhesive strength.

Useful articles which can be prepared with the PSAs of this invention include pressure sensitive adhesive tapes, labels, emblems, and other decorative or informative signs, and the like. An especially useful article is one comprising a support, flexible or rigid, that can withstand extreme temperatures, hot and/or cold, and carrying on at least one surface thereof, the polyorganosiloxane PSAs of this invention. Such an article makes full use of the stability at high temperatures and the flexibility at low temperatures that the PSAs of this invention possess.

A preferred article is a pressure sensitive adhesive tape comprising an impregnated glass cloth, a polyester polymer, a polyimide polymer or a chemically treated fluorocarbon polymer support carrying on at least one surface thereof the cured compositions of this invention.

In order that those skilled in the art may better understand the present invention, the following examples are given to illustrate but not to limit the invention which is fully delineated by the appended claims.

EXPERIMENTAL

In the examples below, the term "MQ resin" refers to 60% by weight solution in toluene of a silicone resin containing $(CH_3)_3SiO_{\frac{1}{2}}$ ("M") units, and $SiO_{4/2}$ ("Q") units and having a silanol content of about 1 to 3% by weight and having a molar ratio of M units to Q units of 0.7; and containing no alkenyl groups.

EXAMPLE 1

Example 1 illustrates the preparation of a pressure sensitive adhesive composition within the scope of the present invention.

Component A is a pre-made intermediate composition containing 54% by weight of a silicone MQ resin and 46% by weight of a low viscosity, vinyl-terminated polydimethylsiloxane having a viscosity of about 215 centipoise at 25° C., a degree of polymerization of about 119.5 ( or 4524 grams/equivalent vinyl), a vinyl content of 0.6% by weight.

Component B is a pre-made intermediate composition containing 54% by weight of a silicone MQ resin and 46% by weight of a hydrogen-stopped polydimethylsiloxane having a hydride content of about 0.023% by weight, a degree of polymerization of 117 (or 4405 grams/equivalent hydride), and a viscosity of 142 centipoise at 25° C.

The platinum catalyst used contains 4.5–5.5% by weight platinum complex catalyst stabilized in solution in excess tetramethyldivinyldisiloxane.

A pressure sensitive adhesive was prepared by mixing 6.0 grams of component A, 10.0 grams of component B, 0.3% by weight of dimethyl maleate inhibitor, and 27 ppm of platinum catalyst based on the total weight of the two pre-made intermediates referred to above. About 1.5 grams of toluene was added to the mixture to yield a solids content of about 90% by weight.

The mixture was applied over a 1 mil thick polyethylene terephthalate (PET) film and cured at 125° C. for five minutes to yield a pressure sensitive adhesive having a thickness of 1.5–2.0 mil.

The peel adhesion of the pressure sensitive adhesive was determined using a Scott Tester, using 180° pull at a rate of 12 inches/minute against a stainless steel plate. Tack was measured by means of a Polyken Probe Tack Tester, manufactured by Testing Machines Incorporated, which was fitted with a probe having a diameter of 0.5 centimeter and operated at a rate of 1 cm/sec and a dwell time of 1 second. A summary of data regarding MQ resin level, hydride/vinyl ratio, vinyl chain length, and hydride chain length for the samples prepared in Example 1 is provided in Table 1 below.

EXAMPLES 2–7

In Examples 2–7, five samples were prepared according to the procedure followed in Example 1, except that the MQ resin level, hydride/vinyl ratio and hydride chain length (represented by "D" which indicates degree of polymerization) varied as indicated in Table 1 below. The compositions prepared in Examples 2–6 had a solids content of about 95% by weight.

A summary of data regarding MQ resin level, hydride/vinyl ratio, vinyl chain length, and hydride chain length for the samples prepared in Examples 2–7 is provided in Table 1 below.

TABLE 1

| | Examples 1–7: Formulations | | | |
|---|---|---|---|---|
| Example No. | MQ Resin Level (Weight %) | Hydride/ Vinyl Ratio | Vinyl Chain Length (D units) | Hydride Chain Length (D units) |
| 1 | 54.00 | 1.70 | 120.00 | 117.00 |
| 2 | 54.00 | 2.20 | 120.00 | 117.00 |
| 3 | 54.00 | 2.64 | 120.00 | 117.00 |
| 4 | 57.00 | 2.63 | 120.00 | 128.00 |
| 5 | 58.00 | 1.01 | 120.00 | 128.00 |
| 6 | 58.00 | 4.28 | 120.00 | 117.00 |
| 7 | 58.00 | 1.55 | 120.00 | 117.00 |

The peel adhesion, tack properties, and quality of cure of the samples prepared in Examples 1–7 are shown in Table 2 below.

TABLE 2

| | Examples 1–7: Properties | | |
|---|---|---|---|
| Example No. | Probe Tack (g/cm$^2$) | Peel Adhesion (ounces/inch) | Quality of Cure |
| 1 | 708 | 30 | Cured Well |
| 2 | 680 | 30 | Cured Well |
| 3 | 860 | 38 | Cured Well |
| 4 | 665 | 33 | Cured Well |
| 5 | 340 | 14 | Residues, Poor Cure |
| 6 | 607 | 40 | Cured Well |
| 7 | 492 | 34 | Cured Well |

The peel adhesion and tack data provided in Table 2 above shows that SiH/SiVinyl ratios which are too low result in pressure sensitive adhesives having significantly lower tack and peel adhesion properties than those prepared using SiH/SiVinyl ratios within the range of the present invention.

EXAMPLE 8

To 5.71 grams of a solventless pre-made blend containing 58% by weight of MQ resin and 42% by weight of vinyl-stopped silicone fluid (120 "D" units) were added 6.2 grams of a solventless pre-made blend containing 58% by weight of MQ resin and 42% by weight of hydride-stopped silicone fluid (128 "D" units), 0.6 grams of toluene, 0.035 grams of dimethyl maleate, and 50 ppm of platinum catalyst. The calculated hydride/vinyl ratio for this composition was 2.01/1. The mixture was coated over a 1 mil thick PET tape and cured at 150° C. for 3 minutes, to form an adhesive having a thickness of 1.6 mil.

The adhesive exhibited a gummy feel and left residues over a steel plate, indicating a poorly cured structure. The probe tack was 340 grams/cm$^2$, and the peel adhesion was 14 ounces/inch with cohesive failure.

EXAMPLE 9

To 3.25 grams of a solventless pre-made blend containing 54% by weight of MQ resin and 46% by weight of vinyl-stopped silicone fluid (120 "D" units) were added 10.0 grams of a solventless pre-made blend containing 58% by weight of MQ resin and 42% by weight of hydride-stopped silicone fluid (128 "D" units), 0.7 grams of toluene, 0.035 grams of dimethyl maleate, and 50 ppm of platinum catalyst. The calculated hydride/vinyl ratio for this composition was 2.63/1. The mixture was coated over a 1 mil thick unprimed PET tape and cured at 150° C. for 3 minutes, to form an adhesive having a thickness of 1.7 mil.

The adhesive formed a well cured residue-free tape and had a tack of 665 grams/$cm^2$ and a peel adhesion of 33 ounces/inch.

EXAMPLE 10

To 7.77 grams of a solventless pre-made blend containing 54% by weight of MQ resin and 46% by weight of vinyl-stopped silicone fluid (120 "D" units) were added 10.0 grams of a solventless pre-made blend containing 58% by weight of MQ resin and 42% by weight of hydride-stopped silicone fluid (128 "D" units), 0.7 grams of toluene, 0.035 grams of dimethyl maleate, and 20 ppm of platinum catalyst. The calculated hydride/vinyl ratio for this composition was 1.10/1. The mixture was coated over a 1 mil thick unprimed PET tape and cured at 125° C. for 3 minutes, to form an adhesive having a thickness of 1.8 mil.

EXAMPLE 11

The procedure described in Example 10 was repeated except that the cured composition was further subjected to post cure at 165° C. for 2 minutes.

EXAMPLE 12

To 3.25 grams of a solventless pre-made blend containing 54% by weight of MQ resin and 46% by weight of vinyl-stopped silicone fluid (120 "D" units) were added 10.0 grams of a solventless pre-made blend containing 58% by weight of MQ resin and 42% by weight of hydride-stopped silicone fluid (128 "D" units), 0.7 grams of toluene, 0.035 grams of dimethyl maleate, and 26 ppm of platinum catalyst. The calculated hydride/vinyl ratio for this composition was 2.63/1. The mixture was coated over a 1 mil thick unprimed PET tape and cured at 125° C. for 3 minutes, to form an adhesive having a thickness of 1.7 mil.

EXAMPLE 13

The procedure described in Example 12 was repeated except that the cured composition was further subjected to post cure at 165° C. for 2 minutes.

EXAMPLE 14

To 1.42 grams of a solventless pre-made blend containing 54% by weight of MQ resin and 46% by weight of vinyl-stopped silicone fluid (120 "D" units) were added 10.0 grams of a solventless pre-made blend containing 58% by weight of MQ resin and 42% by weight of hydride-stopped silicone fluid (128 "D" units), 0.7 grams of toluene, 0.035 grams of dimethyl maleate, and 30 ppm of platinum catalyst. The calculated hydride/vinyl ratio for this composition was 6/1. The mixture was coated over a 1 mil thick unprimed PET tape and cured at 125° C. for 3 minutes, to form an adhesive having a thickness of 1.6 mil.

EXAMPLE 15

The procedure described in Example 14 was repeated except that the cured composition was further subjected to post cure at 165° C. for 2 minutes.

EXAMPLE 16

To 0.85 grams of a solventless pre-made blend containing 54% by weight of MQ resin and 46% by weight of vinyl-stopped silicone fluid (120 "D" units) were added 10.0 grams of a solventless pre-made blend containing 58% by weight of MQ resin and 42% by weight of hydride-stopped silicone fluid (128 "D" units), 0.7 grams of toluene, 0.035 grams of dimethyl maleate, and 32 ppm of platinum catalyst. The calculated hydride/vinyl ratio for this composition was 10/1. The mixture was coated over a 1 mil thick unprimed PET tape and cured at 125° C. for 3 minutes, to form an adhesive having a thickness of 1.5 mil.

EXAMPLE 17

The procedure described in Example 14 was repeated except that the cured composition was further subjected to post cure at 165° C. for 2 minutes.

EXAMPLE 18

To 0.71 grams of a solventless pre-made blend containing 54% by weight of MQ resin and 46% by weight of vinyl-stopped silicone fluid (120 "D" units) were added 10.0 grams of a solventless pre-made blend containing 58% by weight of MQ resin and 42% by weight of hydride-stopped silicone fluid (128 "D" units), 0.7 grams of toluene, 0.035 grams of dimethyl maleate, and 33 ppm of platinum catalyst. The calculated hydride/vinyl ratio for this composition was 12/1. The mixture was coated over a 1 mil thick unprimed PET tape and cured at 125° C. for 3 minutes, to form an adhesive having a thickness of 1.9 mil.

EXAMPLE 19

The procedure described in Example 14 was repeated except that the cured composition was further subjected to post cure at 165° C. for 2 minutes.

EXAMPLE 20

To 0.57 grams of a solventless pre-made blend containing 54% by weight of MQ resin and 46% by weight of vinyl-stopped silicone fluid (120 "D" units) were added 10.0 grams of a solventless pre-made blend containing 58% by weight of MQ resin and 42% by weight of hydride-stopped silicone fluid (128 "D" units), 0.7 grams of toluene, 0.035 grams of dimethyl maleate, and 33 ppm of platinum catalyst. The calculated hydride/vinyl ratio for this composition was 15/1. The mixture was coated over a 1 mil thick unprimed PET tape and cured at 125° C. for 3 minutes, to form an adhesive having a thickness of 1.9 mil.

EXAMPLE 21

The procedure described in Example 14 was repeated except that the cured composition was further subjected to post cure at 165° C. for 2 minutes.

Data regarding MQ resin level, hydride/vinyl ratio, cure time and temperature, and post-cure time and temperature for Examples 10–21 are summarized in Table 3 below. The term "yes" in Table 3 means that the sample was cured and/or post-cured as described hereinabove and indicated in the heading to the column under which the term is found. The term "no" means that the sample was not cured and/or post-cured as indicated in the relevant column.

TABLE 3

Examples 10–21: Formulations

| Example No. | MQ Resin Level (Weight %) | Hydride/ Vinyl Ratio | Cure (125° C., 3 minutes) | Post-Cure (165° C., 2 minutes) |
|---|---|---|---|---|
| 10 | 56.20 | 1.10 | Yes | No |
| 11 | 56.20 | 1.10 | Yes | Yes |
| 12 | 57.00 | 2.63 | Yes | No |
| 13 | 57.00 | 2.63 | Yes | Yes |
| 14 | 57.50 | 6 | Yes | No |
| 15 | 57.50 | 6 | Yes | Yes |
| 16 | 57.70 | 10 | Yes | No |
| 17 | 57.70 | 10 | Yes | Yes |
| 18 | 57.70 | 12 | Yes | No |
| 19 | 57.70 | 12 | Yes | Yes |
| 20 | 57.80 | 15 | Yes | No |
| 21 | 57.80 | 15 | Yes | Yes |

The peel adhesion and tack properties and the quality of cure of the samples prepared in Examples 10–21 were determined and are presented in Table 4 below.

TABLE 4

Examples 10–21: Properties

| Example No. | Tack (grams/cm$^2$) | Peel Adhesion (ounces/inch) | Quality of Cure |
|---|---|---|---|
| 10 | 380 | 12 | Under Cured, gummy residues |
| 11 | 332 | 15 | Under Cured, gummy residues |
| 12 | 406 | 19 | Under Cured, gummy residues |
| 13 | 714 | 29 | Well Cured, No Residue |
| 14 | 322 | 14 | Under Cured, gummy residues |
| 15 | 504 | 27 | Well Cured, No Residue |
| 16 | 362 | 13 | Under Cured, gummy residues |
| 17 | 222 | 27 | Well Cured, No Residue |
| 18 | 348 | 11 | Under Cured, gummy residues |
| 19 | 270 | 26 | Well Cured, No Residue |
| 20 | 372 | 11 | Under Cured, gummy residues |
| 21 | 254 | 24 | Well Cured, No Residue |

Examples 10–17 illustrate the benefit of having a cure reaction occur between the silanol groups on the MQ resin and the terminal hydride groups on the hydride polymer. The films prepared in Examples 10, 12, 14, and 16 were only cured at 125° C. for 3 minutes while those prepared in Examples 11, 13, 15, and 17 were cured at 125° C. for 3 minutes and then post-cured at 165° C. for 2 minutes. The primary reaction at 125° C. was a hydrosilation reaction between vinyl groups on the vinyl polymer and hydride groups on the hydride polymer. Them is only a slight reaction at this temperature between the hydride groups on the hydride polymer and the silanol groups associated with the MQ resin. However, after post-cure at 165° C., good cure and adhesive properties were obtained due to the reaction between the silanol groups associated with the MQ resin and available hydrides on the hydride polymer.

The results obtained for Examples 10–17 further indicate that at a hydride/vinyl ratio of 1.1/1 or less, insufficient reaction occurs, resulting in poor cure.

What is claimed is:

1. A method for preparing a pressure sensitive adhesive having high tack and high peel adhesion, comprising the step of heating to a temperature of about 135° C. or higher for a period of time of from about 3 to about 5 minutes, a mixture comprising by weight:

(A) from about 50 to about 75 parts by weight of a toluene soluble, resinous copolymer comprising $R_3SiO_{\frac{1}{2}}$ units and $SiO_{4/2}$ units wherein R is a monovalent hydrocarbon radical having from 1 to about 6 carbon atoms, wherein the resinous copolymer comprises from about 0.2% to about 5.0% by weight, based on the total weight of the copolymer, of hydroxyl radicals, at least 95% of all R groups being an alkyl group, the total number of R radicals that are alkenyl radicals being 0–0.5% of all R radicals, the molar ratio of $R_3SiO_{\frac{1}{2}}$ units to $SiO_{4/2}$ units being from about 0.6 to about 0.9 inclusive;

(B) an alkenyl-terminated polydiorganosiloxane having a viscosity of from about 10 to about 500 centipoise at 25° C. and having the general formula (I)

$$R^2R^1_2SiO(R^3_2SiO)_mSiR^1_2R^2$$

wherein each $R^1$ is independently an alkyl group having from 1 to about 10 carbon atoms or an aryl group, $R^2$ is an alkenyl group having from 1 to about 10 carbon atoms, each $R^3$ is independently $R^1$ or $R^2$, with the proviso that at least 99.5% of all $R^3$ radicals are $R^1$, and "m" is a number in the range of from about 1 to about 300;

(C) a hydride-terminated organohydrogenpolysiloxane compatible with the mixture of (A) and (B) and having a viscosity of from about 10 to about 1000 centipoise at 25° C. and having the general formula $$R^4_2HSiO(R^5_2SiO)_aSiHR^4_2 \qquad (II)$$

wherein each $R^4$ is independently an alkyl group having from 1 to about 10 carbon atoms or an aryl group, and each $R^5$ is hydrogen or $R^4$, with the proviso that at least 99.5% of all $R^5$ radicals are $R^4$, "a" is a number in the range of from 1 to about 500, there being at least two silicon bonded hydrogen atoms per molecule of (C), no silicon atom bearing more than one silicon bonded hydrogen atom; the total of (B) and (C) being from about 25 to about 50 parts by weight; the total of (A), (B), and (C) being 100 parts by weight; the molar ratio of silicon-bonded hydrogen groups in (C) to silicon-bonded alkenyl groups in (A) and (B) being in the range of from about 1.2:1 to about 15.0:1;

(D) a catalytic amount of a hydrosilation catalyst; and (E) from 0 to about 40% by weight of an organic solvent.

2. A method for preparing a pressure sensitive adhesive having high tack and high peel adhesion, comprising the step of heating to a temperature of about 125° C. or higher for a period of time of at least about 5 minutes, a mixture comprising by weight:

(A) from about 50 to about 75 parts by weight of a toluene soluble, resinous copolymer comprising $R_3SiO_{\frac{1}{2}}$ units and $SiO_{4/2}$ units wherein R is a monovalent hydrocarbon radical having from 1 to about 6 carbon atoms, wherein the resinous copolymer comprises from about 0.2% to about 5.0% by weight, based on the total weight of the copolymer, of hydroxyl radicals, at least 95% of all R groups being an alkyl group, the total number of R radicals that are alkenyl radicals being 0–0.5% of all R radicals, the molar ratio of $R_3SiO_{\frac{1}{2}}$ units to $SiO_{4/2}$ units being from about 0.6 to about 0.9 inclusive;

(B) an alkenyl-terminated polydiorganosiloxane having a viscosity of from about 10 to about 500 centipoise at 25° C. and having the general formula $$R^2R^1{}_2SiO(R^3{}_2SiO)_mSiR^1{}_2R^2 \qquad (I)$$

wherein each $R^1$ is independently an alkyl group having from 1 to about 10 carbon atoms or an aryl group, $R^2$ is an alkenyl group having from 1 to about 10 carbon atoms, each $R^3$ is independently $R^1$ or $R^2$, with the proviso that at least 99.5% of all $R^3$ radicals are $R^1$, and "m" is a number in the range of from about 1 to about 300;

(C) a hydride-terminated organohydrogenpolysiloxane compatible with the mixture of (A) and (B) and having a viscosity of from about 10 to about 1000 centipoise at 25° C. and having the general formula $$R^4{}_2HSiO(R^5{}_2SiO)_aSiHR^4{}_2 \qquad (II)$$

wherein each $R^4$ is independently an alkyl group having from 1 to about 10 carbon atoms or an aryl group, and each $R^5$ is hydrogen or $R^4$, with the proviso that at least 99.5% of all $R^5$ radicals are $R^4$, "a" is a number in the range of from 1 to about 500, there being at least two silicon bonded hydrogen atoms per molecule of (C), no silicon atom bearing more than one silicon bonded hydrogen atom; the total of (B) and (C) being from about 25 to about 50 parts by weight; the total of (A), (B), and (C) being 100 parts by weight; the molar ratio of silicon-bonded hydrogen groups in (C) to silicon-bonded alkenyl groups in (A) and (B) being in the range of from about 1.2:1 to about 15.0:1;

(D) a catalytic amount of a hydrosilation catalyst; and (E) from 0 to about 40% by weight of an organic solvent.

* * * * *